US011869315B2

(12) United States Patent
Dobski

(10) Patent No.: US 11,869,315 B2
(45) Date of Patent: Jan. 9, 2024

(54) SYSTEM AND METHOD FOR SPORTS GAME

(71) Applicant: Brian Dobski, West Hollywood, CA (US)

(72) Inventor: Brian Dobski, West Hollywood, CA (US)

( * ) Notice: Subject to any disclaimer, the term of this patent is extended or adjusted under 35 U.S.C. 154(b) by 78 days.

(21) Appl. No.: 17/244,567

(22) Filed: Apr. 29, 2021

(65) Prior Publication Data

US 2022/0101695 A1 Mar. 31, 2022

Related U.S. Application Data

(60) Provisional application No. 63/085,705, filed on Sep. 30, 2020.

(51) Int. Cl.
*G07F 17/32* (2006.01)
*G06Q 50/34* (2012.01)

(52) U.S. Cl.
CPC ......... *G07F 17/3276* (2013.01); *G06Q 50/34* (2013.01); *G07F 17/3244* (2013.01); *G07F 17/3288* (2013.01)

(58) Field of Classification Search
CPC . G06Q 50/34; G07F 17/3288; G07F 17/3244; G07F 17/3276
USPC .......................................................... 463/25
See application file for complete search history.

(56) References Cited

U.S. PATENT DOCUMENTS 6,474,647 B1 * 11/2002 Zakhar ................ A63F 3/00157 273/287
8,506,394 B2 * 8/2013 Kelly .................. G07F 17/3267 463/16
9,483,908 B2 * 11/2016 Shore .................. G07F 17/3244
9,870,674 B2 * 1/2018 Hayon .................... G07F 17/32
9,873,040 B1 * 1/2018 Kim ........................ A63F 13/47
10,720,009 B2 * 7/2020 Simons ............... G07F 17/3295
11,270,556 B2 * 3/2022 Givant ................ G07F 17/3223
2021/0082254 A1 * 3/2021 Givant .................. G07F 17/323
2021/0183203 A1 * 6/2021 Wang .................. G07F 17/3239
2021/0217277 A1 * 7/2021 Huke ...................... G06F 17/15
2022/0358808 A1 * 11/2022 Huke .................... G07F 17/323

OTHER PUBLICATIONS

Action Network Staff, "Introducing the 2018 Gambling Olympics: A $30,000 Betting Free-For-All", https://web.archive.org/web/20201030080057/https://www.actionnetwork.com/gambling-olympics/gambling-olympics-las-vegas-action-network-2018, Jul. 9, 2018. ( Year: 2018).*
Britannica, "pentathlon, athletic contest", https://www.britannica.com/sports/pentathlon, 1912 by reference. (Year: 1912).*
French Lick Resort Blog, "Brush Up On Your Sports Betting Basics", https://frenchlickresort.blogspot.com/2019/09/brush-up-on-your-sports-betting-basics.html, Sep. 4, 2019. (Year: 2019).*

* cited by examiner

*Primary Examiner* — Michael A Cuff
(74) *Attorney, Agent, or Firm* — Howard & Howard Attorneys PLLC

(57) ABSTRACT

A system and method for sports gaming and wagering. A game system includes a game server and user gaming devices in communication over a network. A wagering game involves multiple players in virtual gaming rooms, each player must complete a series of bets over a predefined time period or over a predefined sporting event or tournament, with the participating players competing against each other to achieve the highest score, winnings, or ranking.

20 Claims, 12 Drawing Sheets

SYSTEM AND METHOD FOR SPORTS GAME

CROSS-REFERENCE TO RELATED APPLICATIONS

This application claims the benefit of U.S. Provisional Patent Application No. 63/085,705, filed Sep. 30, 2020, the disclosure of which is hereby incorporated herein in its entirety by reference.

BACKGROUND

Sports betting and gaming related to sporting events have long been popular among sports enthusiasts as a way to increase their interaction and participation in connection with their favorite sports teams. With the advent of the Internet and social media, online sports gaming has become increasingly popular. Direct betting on the outcome of sporting events and actions within those events is generally popular with more experienced bettors, while fantasy leagues and indirect betting is generally more popular with novice or less experienced gamblers. In both cases, the availability of access to such games online has further increased their popularity.

While popular, many such online games require a great amount of sports knowledge on the part of the gamer. The games are not necessarily structured to provide instruction to novice or less-experienced bettors, or to provide any entertainment value beyond the actual outcome of the betting.

Thus, it can be seen that there remains a need in the art for a gaming system that provides educational and entertainment value and is easy an intuitive for new users to learn.

SUMMARY

Exemplary embodiments are defined by the claims below, not this summary. A high-level overview of various aspects thereof is provided here to introduce a selection of concepts that are further described in the detailed description section below. This summary is not intended to identify key features or essential features of the claimed subject matter, nor is it intended to be used in isolation to determine the scope of the claimed subject matter. In brief, this disclosure describes systems and methods for an online multi-player gaming system that provides an instructional, entertainment, and social aspect in addition to a gambling aspect that is indirectly tied to the outcomes of various sports matches.

In one aspect, the system and method of the present invention provide a game room environment in which participants team with other players in their virtual room to compete against other teams of players in other virtual rooms.

In another aspect, the system and method of the present invention provide a defined game in which players must complete a series of bets over a predefined time period or over a predefined sporting event or tournament, with the participating players competing against each other to achieve the highest score, winnings, or ranking.

In another aspect, the system and method of the present invention provide an introduction and instruction to players on the concepts of sports gaming, including betting lines, spreads, and the like.

In another aspect, the system and method of the present invention provide a secure online transactional environment utilizing an efficient communications protocol to minimize the bandwidth usage of the gaming system by employing one or more peer-to-peer networking protocols to avoid continuous communication with a gaming server.

DESCRIPTION OF THE DRAWINGS

Illustrative embodiments are described in detail below with reference to the attached drawing figures, and wherein.

DETAILED DESCRIPTION

The subject matter of select exemplary embodiments is described with specificity herein to meet statutory requirements. But the description itself is not intended to necessarily limit the scope of claims. Rather, the claimed subject matter might be embodied in other ways to include different components, steps, or combinations thereof similar to the ones described in this document, in conjunction with other present or future technologies. Terms should not be interpreted as implying any particular order among or between various steps herein disclosed unless and except when the order of individual steps is explicitly described. The terms “about” or “approximately” as used herein denote deviations that are insignificant to the function.

Figure 1:
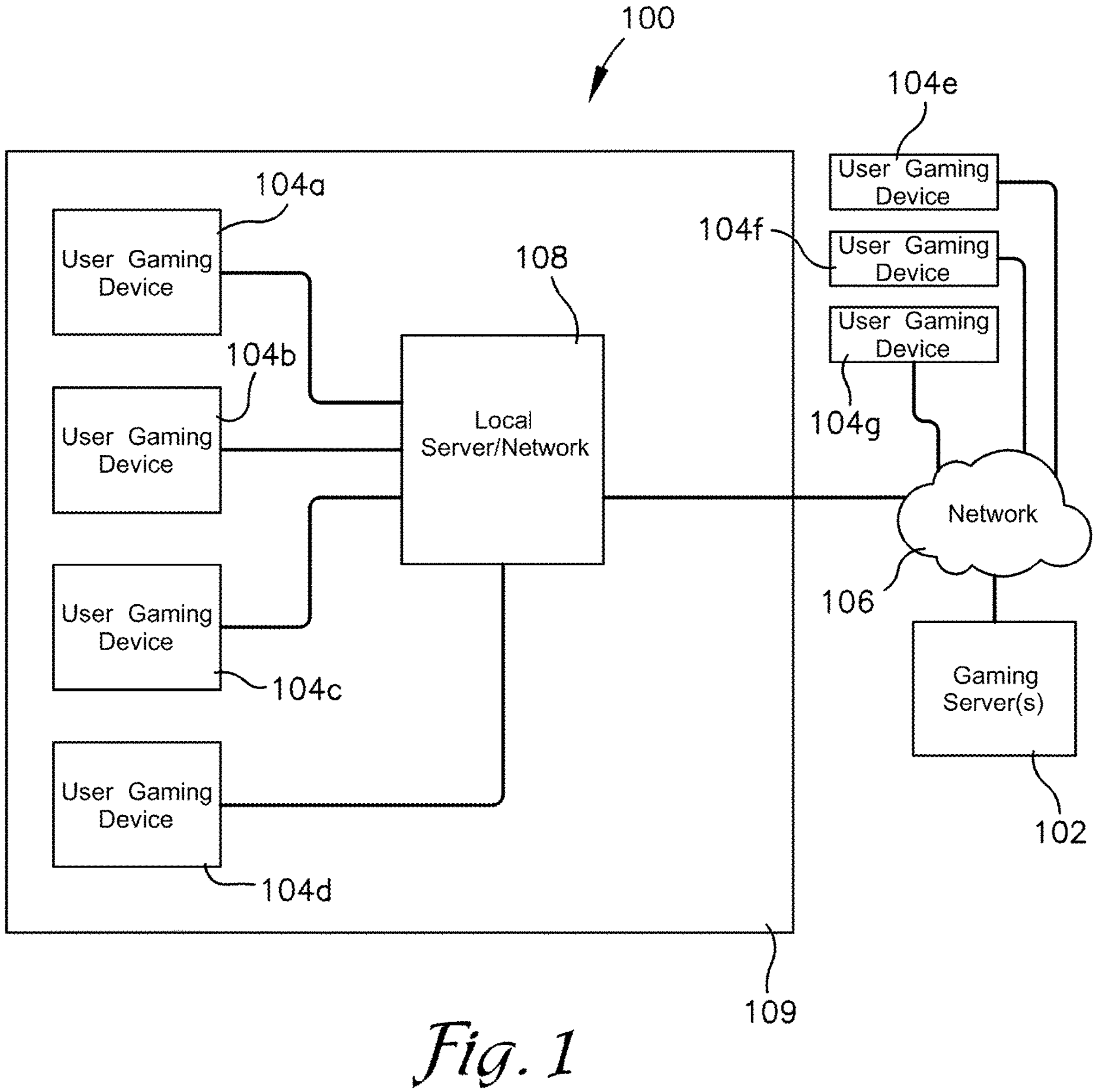
FIG. 1 is a block diagram of a system for a sports wagering game in accordance with an exemplary embodiment of the present invention.

Looking to FIG. 1, a sports wagering gaming system in accordance with an exemplary embodiment of the present invention is depicted generally by the numeral 100. Gaming system 100 comprises a gaming server 102 connected to a plurality of gaming devices 104 via a network 106.

In the exemplary system of FIG. 1, gaming devices 104*a*, 104*b*, 104*c*, 104*d* are co-located in a single grouping 109, such as a room, so that induvial users of the gaming devices can talk and interact with each other as they play the game. In that configuration, the plurality of gaming devices 104*a*, 104*b*, 104*c*, 104*d* are connected to a common local server and/or network 108, with that local server 108 in further communication with the gaming server 102 through network 106. As further depicted in the exemplary system of FIG. 1, additional user gaming devices 104*e*, 104*f*, 104*g* are each separately in communication with the gaming server 102 through the network 106. Thus, each user gaming device is in communication with the gaming server through network 106, either directly or indirectly through further networks and/or servers.

Gaming devices 104 preferably include a processor, memory, a display screen, and communications circuitry to allow a user to access and interact with a game served by gaming server 102. For example, gaming device 104 may be laptop computers, desktop computers, cellular telephones, handheld electronic tablets, electronic gaming machines, or any other device suitable for interacting with the gaming server 102.

Gaming server 102 may be a single server, or may be a configuration of servers co-located or geographically dispersed as is known in the art. Network 106 may be a wide area network (WAN) such as the Internet, or may be a configuration of local area networks (LANS), or combinations thereof. Network 106 and local network 108 may further comprise cellular telephone networks or any other network communications systems known in the art.

The system of the present invention is preferably configured as a peer-to-peer system in which player's devices perform most of the game operations without reliance on a central server (other than as a means to facilitate communication). Thus, the system uses minimal bandwidth as compared to a centrally-run system, and provides a more robust experience as reliance on predetermined central servers is eliminated.

Figure 2:
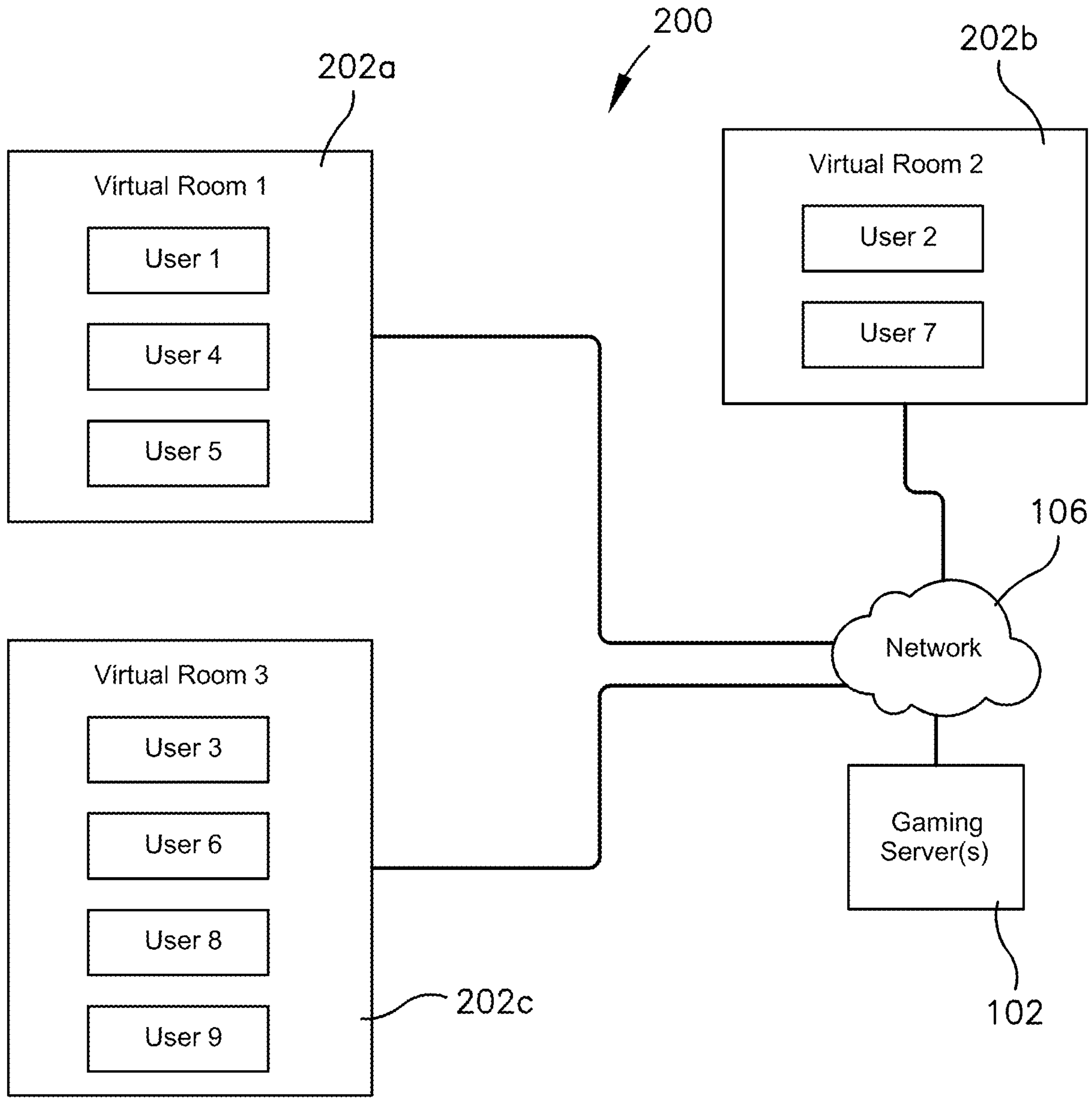
FIG. 2 is a block diagram of a system and method for a sports wagering game in accordance with an exemplary embodiment of the present invention.

Turning to FIG. 2, an arrangement of users participating in a gaming session in accordance with an exemplary embodiment of the present invention is depicted by the numeral 200. Users are grouped into several virtual rooms 202*a*, 202*b*, 202*c*, where they participate in placing bets on sporting event in accordance with the rules of the game, as will be described in more detail below.

It should be understood that the virtual rooms 202*a*, 202*b*, 202*c* do not necessarily correlate with the user groupings of FIG. 1—the users and gaming devices of FIG. 1 share a location and local server, while the virtual rooms of FIG. 2 define separate groups or teams that compete against each other in the game.

For example, the users of the four gaming devices 104*a*, 104*b*, 104*c*, 104*d* as shown in FIG. 1 may each be in a separate virtual room for purposes of playing the game. Thus, the depiction in FIG. 1 is of an exemplary physical arrangement of the hardware for implementing the game, the depiction in FIG. 2 is of a virtual arrangement of users/players of the game.

With the gaming devices, gaming server, and networks set forth, a description of the game will now be presented in conjunction with exemplary screen shots presented to users on their gaming devices. Each player will preferably be presented with home screens and game screens that allow them to participate in virtual rooms and to bet according to the rules of the game for whichever sport or sports they are following.

As described above, the various users (i.e. players) are divided into a plurality of virtual rooms, which virtually group the players against each other in the gameplay. In a preferred embodiment, the players join the virtual room and compete against each other for a game of a defined period of time and/or for a defined sporting competition. For example, a game may span a period of one week in which players bet on any desired sports, or in which players bet on a specific sport, such as Major League Baseball. Or, a game may span a weekend in which players bet on National Football League games. In other alternatives, a game may span a first round of a sporting competition, such as an NCAA playoff round, or may span an entire competition, such as an NCAA basketball tournament. The game as described herein may thus be applied and played with respect to any such defined event, tournament, and/or time period.

Figure 3:
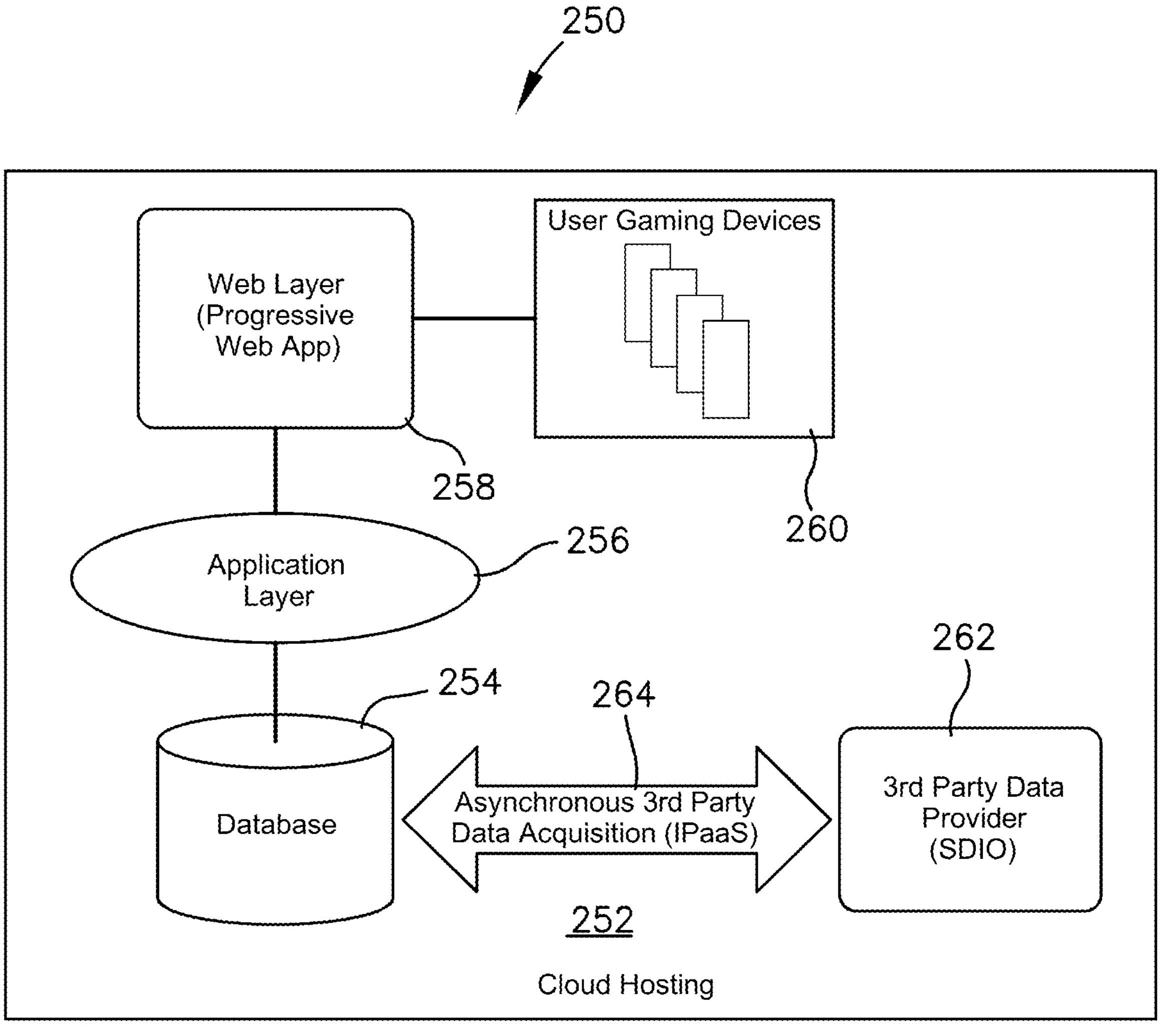
FIG. 3 is a block diagram of an exemplary implementation of a system for implementing a sports wagering game in accordance with an exemplary embodiment of the present invention.

Looking to FIG. 3, an exemplary embodiment of the architecture of an implementation of the sports wagering gaming system of the present invention is depicted by the numeral 250. The system comprises a cloud hosting environment 252, with user gaming devices 260 in communication with a Web layer 258, which further communicates through an application layer 256 to a database 254. The database 254 communicates through an asynchronous link 264 to third party data providers 262.

Figure 4:
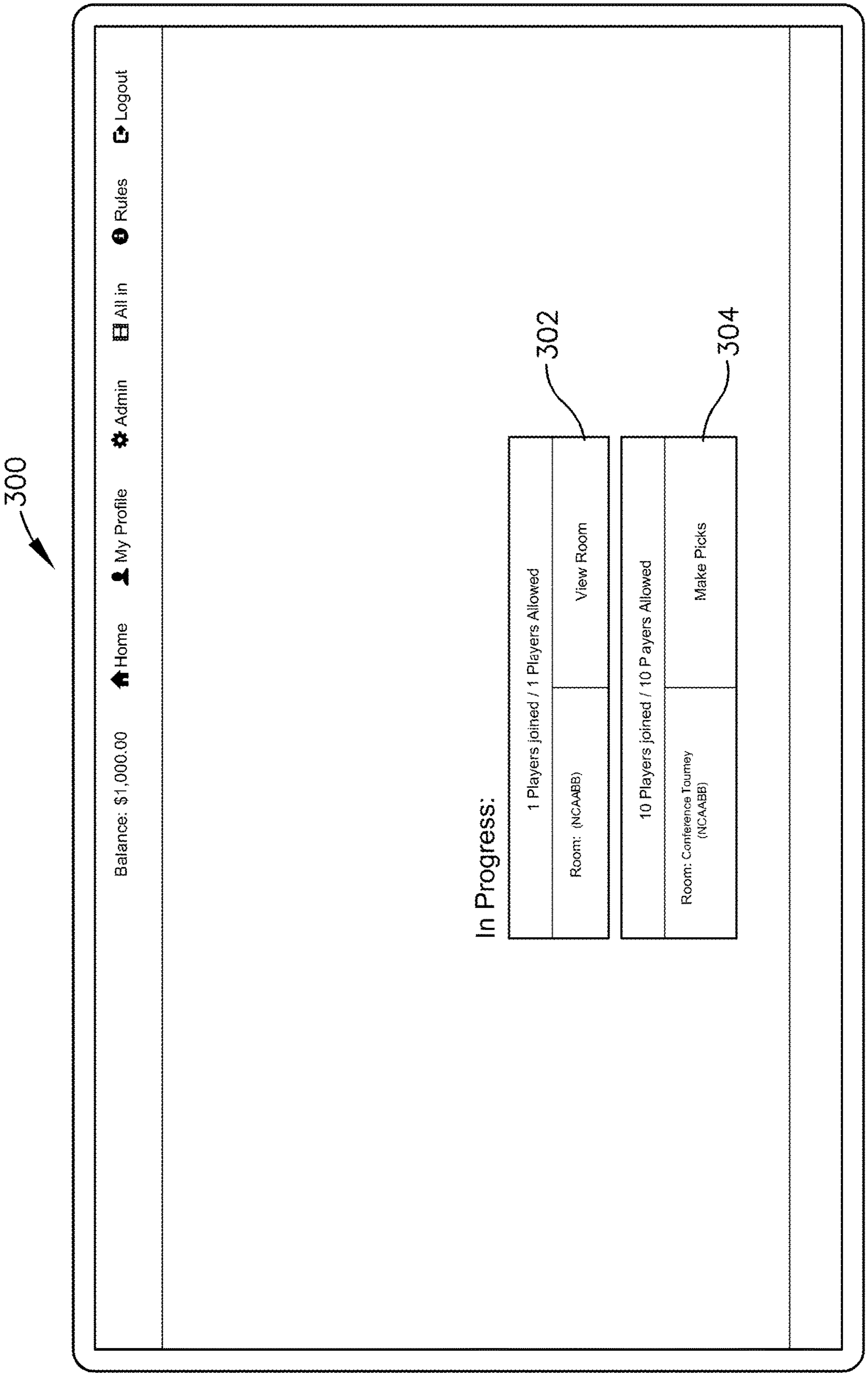
FIG. 4 is a screen shot of an exemplary joining screen of a gaming device in accordance with the present invention.
Figure 5:
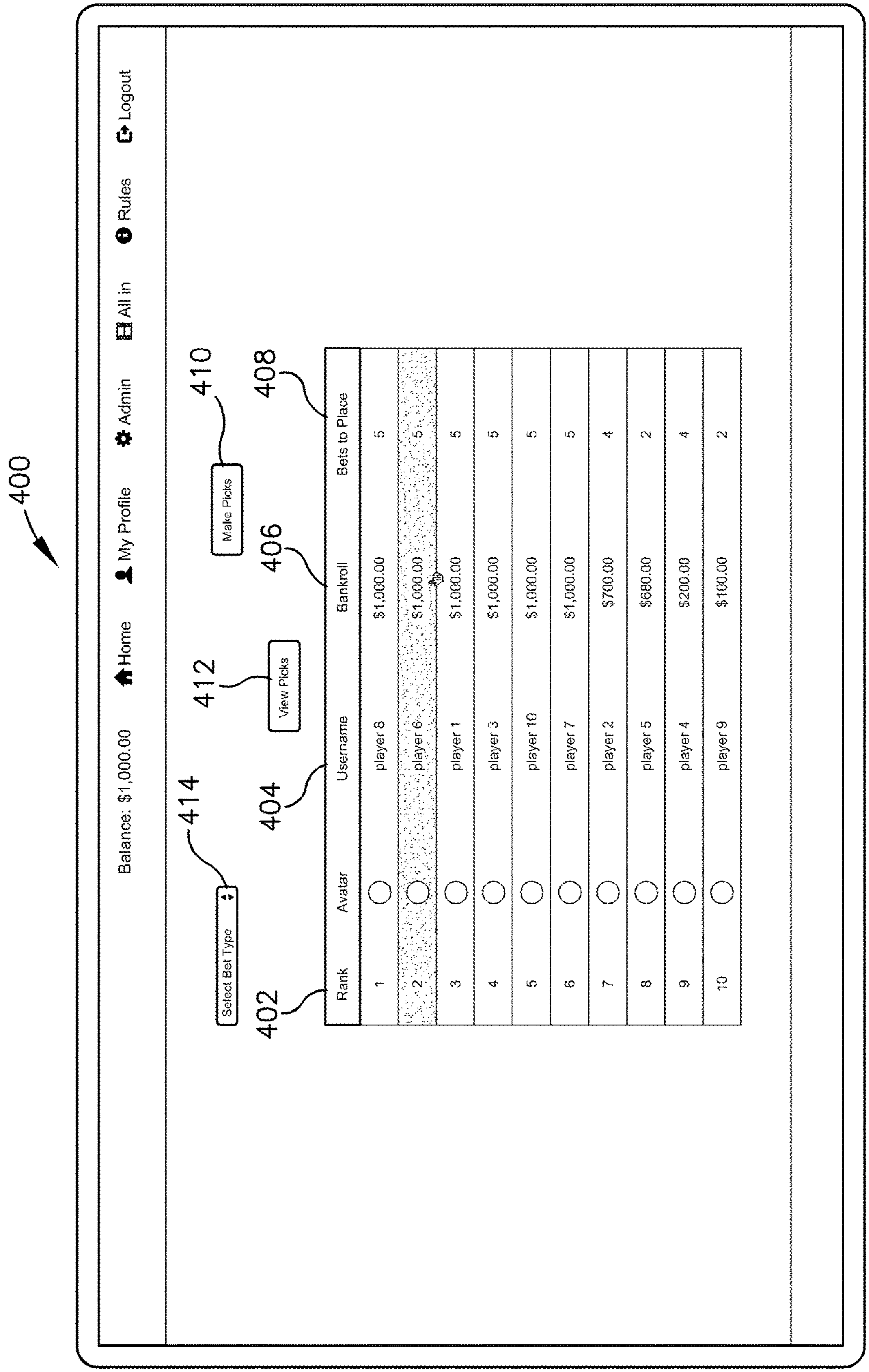
FIG. 5 is a screen shot of an exemplary leader board screen of a gaming device in accordance with the present invention.

Looking to FIGS. 4 and 5 in conjunction, in an exemplary embodiment, each player must join a virtual room and make a predetermined number of bets (in this case, 5 bets) over the course of the corresponding time period, using the odds boards displayed. It should be understood that each player, using their gaming device, must first login to the gaming server using a username, password, and/or other credentials as is known in the art.

As seen in the screen shot of FIG. 4, a player is presented with an opening screen 300 showing various rooms and/or games available for viewing and/or for entering to make picks. Thus a player may select the "view room" button to view the leaderboard and other activity in a room (as will be described in more detail below), or may select the "make picks" button 304 to enter a room and place bets in accordance with the game.

Upon entering a room, as seen in FIG. 5, a user is initially presented with a leaderboard screen 400 showing the rankings 402 of all of the players 404 in the virtual room in comparison to the other players in that virtual room, along with statistics showing each player's remaining bankroll 406 and the number of bets remaining 408 to be made for each player. The player is further presented with buttons allowing him or her to "make picks" 410 (i.e., select a predicted or desired outcome of a sporting match, such as a particular game), "view picks" 412 to see what picks he or she has already made, and "select bet type" 414 to choose one of the five required bets to be made.

The game play comprises each player starting with an initial bankroll (e.g., $1,000) with which to place bets over the course of the predetermined time period and/or sporting event. Over the course of play during that predetermined time period, each player must place one of each of five different bet types, namely over/under, spread, underdog, favorite, and parlay. For each bet type, the player must select a game/matchup and the amount of bankroll to bet on that matchup. Winnings are added to the player's bankroll and losses are subtracted so that as the time period passes and matches/events are completed, players win and lose money according to their various bets. It should be understood that each player must make one, and only one, of each of the five types of bets, and that the five bets must be completed within the predetermined time period or the player will be disqualified. At the end of the time period, the player that has accumulated the largest bankroll will be the winner of that game.

It should be further understood that each player's five bets may be made in any desired order, and that each of the five bets may be made at any time within the predetermined time period. Thus, for example, a player may make all five bets on the first day of a tournament, may wait until the last day to make the five bets, or may make the bets as the time period our tournament progresses. Of course, spreading the bets out over the tournament generally allows a player to potentially accumulate bankroll that may then be further bet on subsequent events, and thus potentially win more that if, for example, the player made five bets on the initial day of an event or tournament.

As the tournament or time period progresses and games are completed, each player's statistics (bankroll and bets remaining) are updated to allow the player and other player's within the virtual room to see the players' rankings. Players may also view other virtual rooms to compare rankings of other teams of players.

In addition to teams of players potentially being co-located to allow interaction with other players during the game, players may also be connected via audio, video, streaming, or other communications means to allow discussion and trash talk among and between players and teams.

With the basic rules and requirements of the game set forth, an exemplary walk-through of the game with respect to hypothetical NFL weekend will now be presented.

For purposes of this example, four players (player 1, player 2, player 3, and player 4) will be participating. Each player accesses the gaming system using their pre-established sign-in credentials, e.g., a username and password, and other authentication required. Upon login, each player is presented with a home screen and game setup screen as previously described. Each player joins a common virtual "room" which establishes those four players into a common scenario or room for the duration of at least one week (for NFL games, or other period of time depending on the sporting event that is the subject of the gaming).

Assuming the start of the week, e.g., week 2 of the NFL, each player buys in with an initial $1,000 bankroll. It should be understood that the game may be adapted for scenarios in which the game uses dollar amounts or money, or for scenarios where players monetarily buy-in to receive chips, with a payout to the winner corresponding to their final bankroll or chip total, or may be adapted to contest or free-play scenarios in which a sponsoring agent provides a prize amount and players are not required to buy-in to the game. In either case, the gameplay—regardless of how the players buy-in or obtain or receive their initial bankroll or chips—proceeds in the same manner.

With each of the four players having an initial $1,000 bankroll, connected in a common virtual room, the gameplay proceeds with each player required, over the course of the week, to place one bet on each type available bet—a money line favorite bet, an underdog bet, a point spread bet, a point total over/under bet, and a 2-team parlay (that uses a combination of the first 4 bets) bet, using the 16 NFL games to be played during week 2 of the NFL. Each bet preferably has a minimum bet limit, such as a $100 minimum bet.

In a preferred rule scheme, the 2-team parlay bet may include a bet that has been chosen as another bet. For example, if player 1 chooses the New Orleans Saints as an underdog pick to win the game against the Los Angeles Rams, that same game can be chosen by player 1 in the 2-team parlay, i.e., player 1 may also choose the Saints to beat the Rams as part of the 2-team parlay bet.

Assume player 1 selected the Panthers on Thursday football as his or her money line favorite, and the Panthers lost the game. Player 1 at that point has $700. Betting on the Sunday games for that week, player 1 bets $300 on the Jacksonville point spread (+9) and $200 on the San Francisco 49ers—a money line underdog bet. Both bets win, so player 1 wins $285 and $220, respectively, for a total bankroll of $1,205 at that point. Player 1 thus has 2 bets remaining to make (because each player must bet once on each of the five types of bets)—the point total over/under and 2-team parlay. Player 1 bets $650 on the Rams Saints over bet and loses, making the total bankroll $555. For the final bet on the 2-team parlay, player 1 bets all $555 on the Cowboys money line and the Eagles/Falcons under, winning $865, with a final total of $1,420.

In the same virtual room, player 2 places three bets on the Sunday games, betting $200 on the Titans as money line favorite bet, $100 on the point total over bet in the 49ers/Bengals game, and $400 on the 2-team parlay bet—with the Cowboys money line favorite with the Seahawks money line underdog. Based on the outcome of those bets, player 2's bankroll stands at $1,650 with two bets remaining. Player 2 places a $200 bet on the Raiders as underdog against the Chiefs and loses, leaving a bankroll of $1,450. For the final bet, player 2 bets $450 on the Jets to beat the point spread, but loses, leaving a total bankroll of $1,000.

Player 3 bets $500 on the Tampa Bay Buccaneers on Thursday night as money line underdog and wins $750, for an interim total of $1,750. Player 3 then bets $400 on the Cardinals as the spread bet (+13.5) and wins, for an interim total of $2,080. Player 3, next bets $200 on the 2-game parlay—Lions money line underdog bet and Saints/Rams over bet—and loses, for an interim bankroll total of $1,880. Finally, player 3 bets $500 on the Chiefs as money line favorite and wins, leaving player 3 with a final total of $2,105 for the week.

Finally, player 4 initially bets $200 on the Buccaneers as the money line underdog bet and wins, for an interim total of $1,250. Next, player 4 bets $400 on the 2-team parlay, choosing the Jaguars with points as the spread bet and the 49ers as money line underdog bet. The $780 wins increases the bankroll to $2,030. For the third bet, player 4 bets $500 on the Chiefs to win on a money line favorite bet, and wins, for an interim total of $2,285. For the spread bet, player 4 chooses the Saints with points (+3) for $200 and loses, leaving an interim bankroll of $2,085. Finally, player 4 bets on an over/under bet on the Browns versus Jets, winning and bringing the final bankroll total to $2, 285.

Thus, at the end of the week, player 4 is the winner with $2,285 and thus will receive a payout of his or her winnings based on that winning total.

It should be understood and apparent from the described scenario that each player must place all five bets, one, and only one, each of the required bet type, and must place a bet of at least $100 on each bet. Over the course of the week the four players remain in the same virtual room and play against each other for the duration of the week. In subsequent weeks, players may choose to again play against each other, or may choose to join other virtual rooms with other players.

With that exemplary walk-through of the game play set forth, the game play will now be further described with respect to the system of FIGS. 1 and 2 as previously described, with a description of exemplary screenshots provided to users on their gaming devices.

Figure 6:
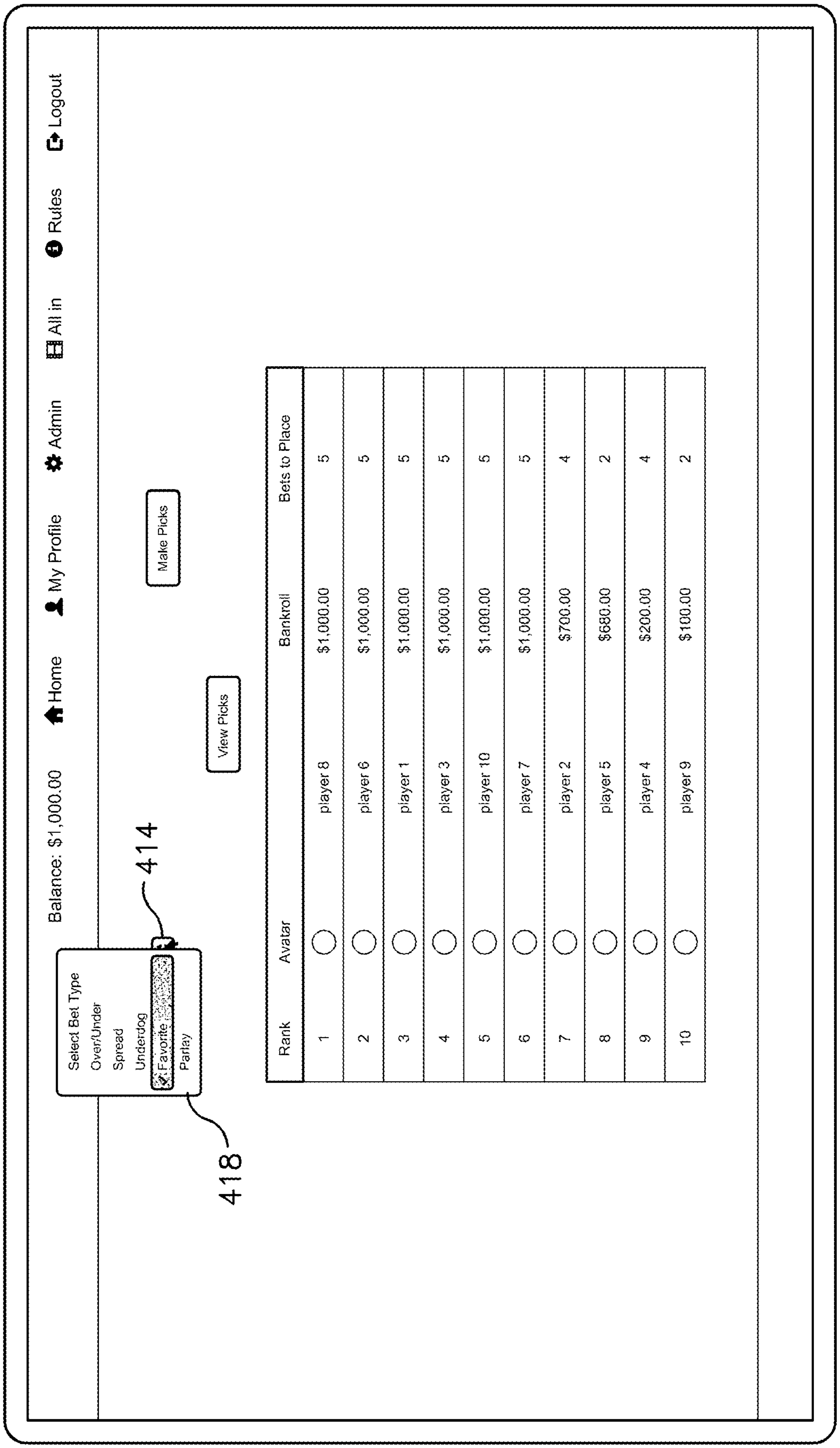
FIG. 6 is a screen shot of an exemplary place bet screen of a gaming device in accordance with the present invention.

Looking to FIG. 6, as described above, a player must place one of each type of bet during the course of the game.

Pressing or clicking the "Select Bet Type" button 414 on their user gaming device, a player is presented with a pop-up menu 418, which presents each of the five bet types that must be placed: "Over/Under", "Spread", "Underdog", "Favorite", and "Parlay". From the pop-up menu 418 a player may select a bet that he or she wants to make. In a preferred embodiment, the selections on the pop-up menu 418 will be unavailable and/or greyed-out to prevent selection if a player has already made a bet of that type. Thus, they system itself prevents a player from making more than one bet of the same type.

Continuing with the example of FIG. 6, a player selecting the "Favorite" bet from the pop-up menu 418 is then presented with the screen of FIG. 6 on their gaming device.

Figure 7:
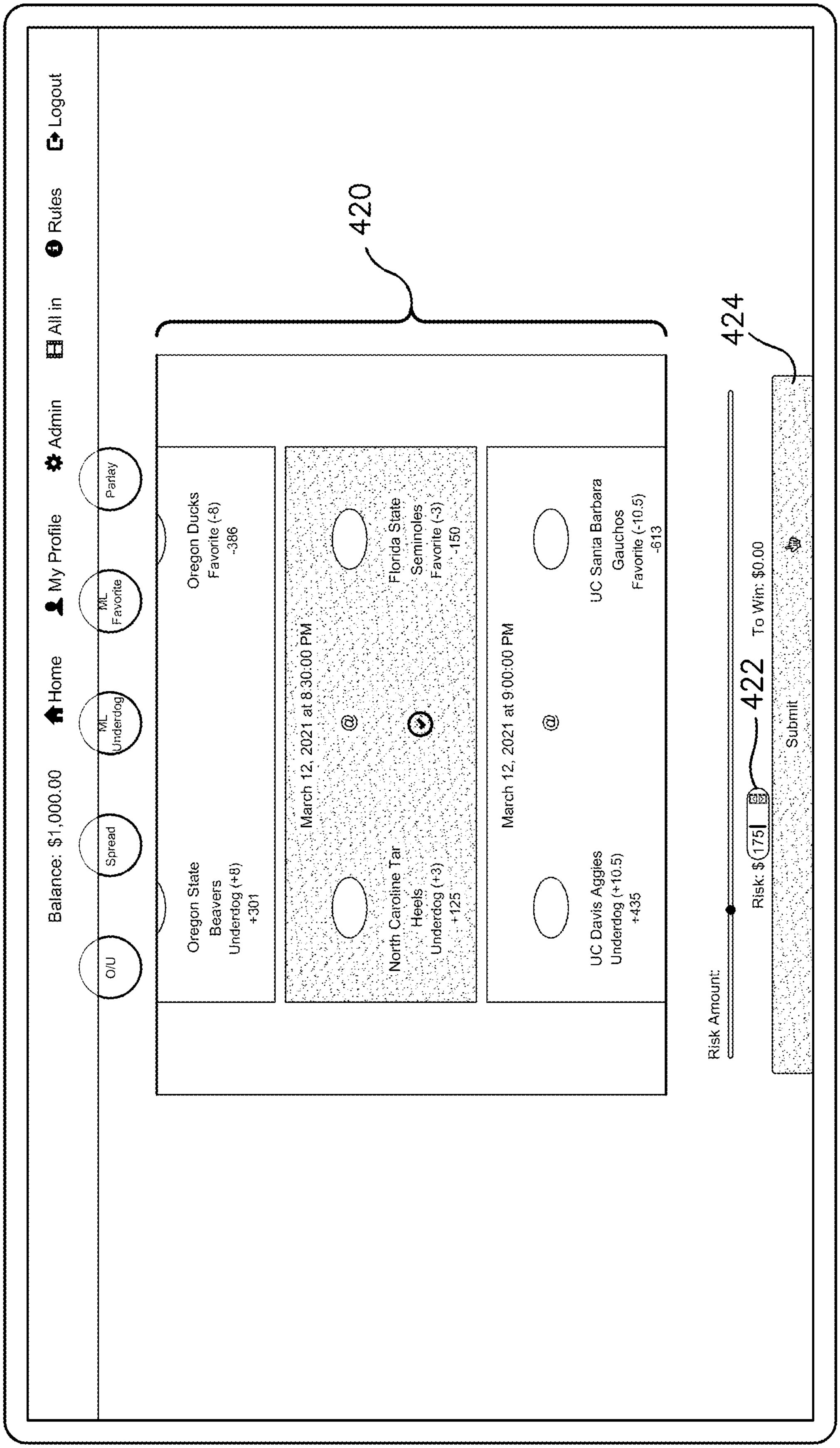
FIG. 7 is a screen shot of an exemplary selection screen of a gaming device in accordance with the present invention.

Looking to FIG. 7, a scroll window 420 is presented that allows a player to scroll through all of the matchups corresponding to a game's time period or tournament, etc. Thus, in this example, a player has scrolled through to the North Carolina vs Florida State game and selected that game to bet as the moneyline "Favorite". As seen in the scroll window 420, statistical and betting information for each matchup is presented to the user to allow them to make an informed selection.

As seen at the bottom of the screen, a "Risk" field 422 allows a player to enter an amount to bet on that selected game, in this case $175. A "Submit" button 424 is presented to the user to allow submitting that selected game and bet amount.

Figure 8:
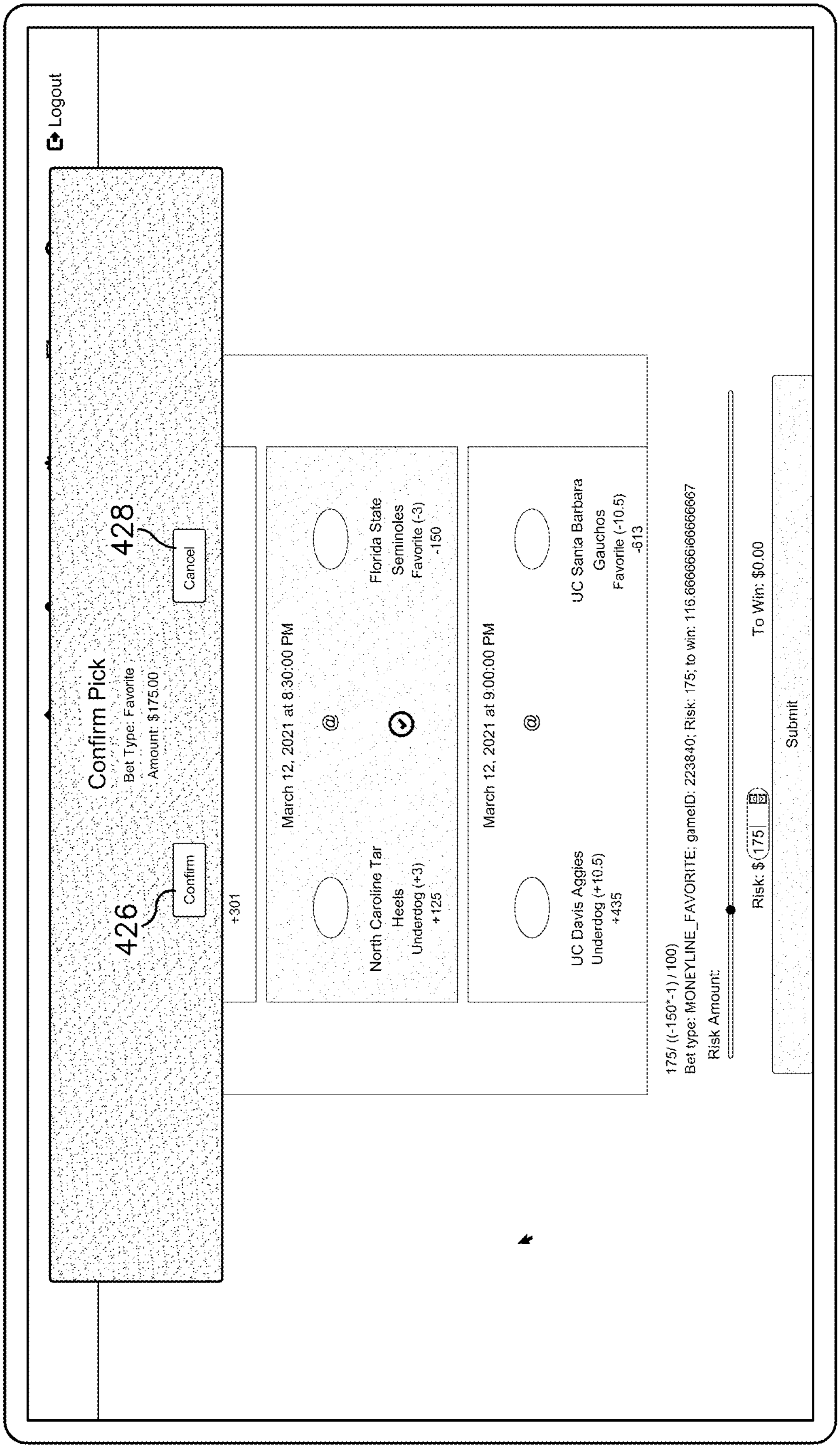
FIG. 8 is a screen shot of an exemplary first confirmation screen of a gaming device in accordance with the present invention.

Upon submitting the selection and bet amount, the user is presented with a confirmation screen as shown in FIG. 8. At this screen, the user is presented on their gaming device with a final "Confirm" 426 or "Cancel" 428 choice. Upon confirming (using Confirm button 426), the player's selection and bet amount is finalized and can no longer be changed. If the player chooses to cancel the bet, then they are returned to the previous screen to select a different game or amount, or can return to the home screen to view results and/or to place a different bet.

Figure 9:
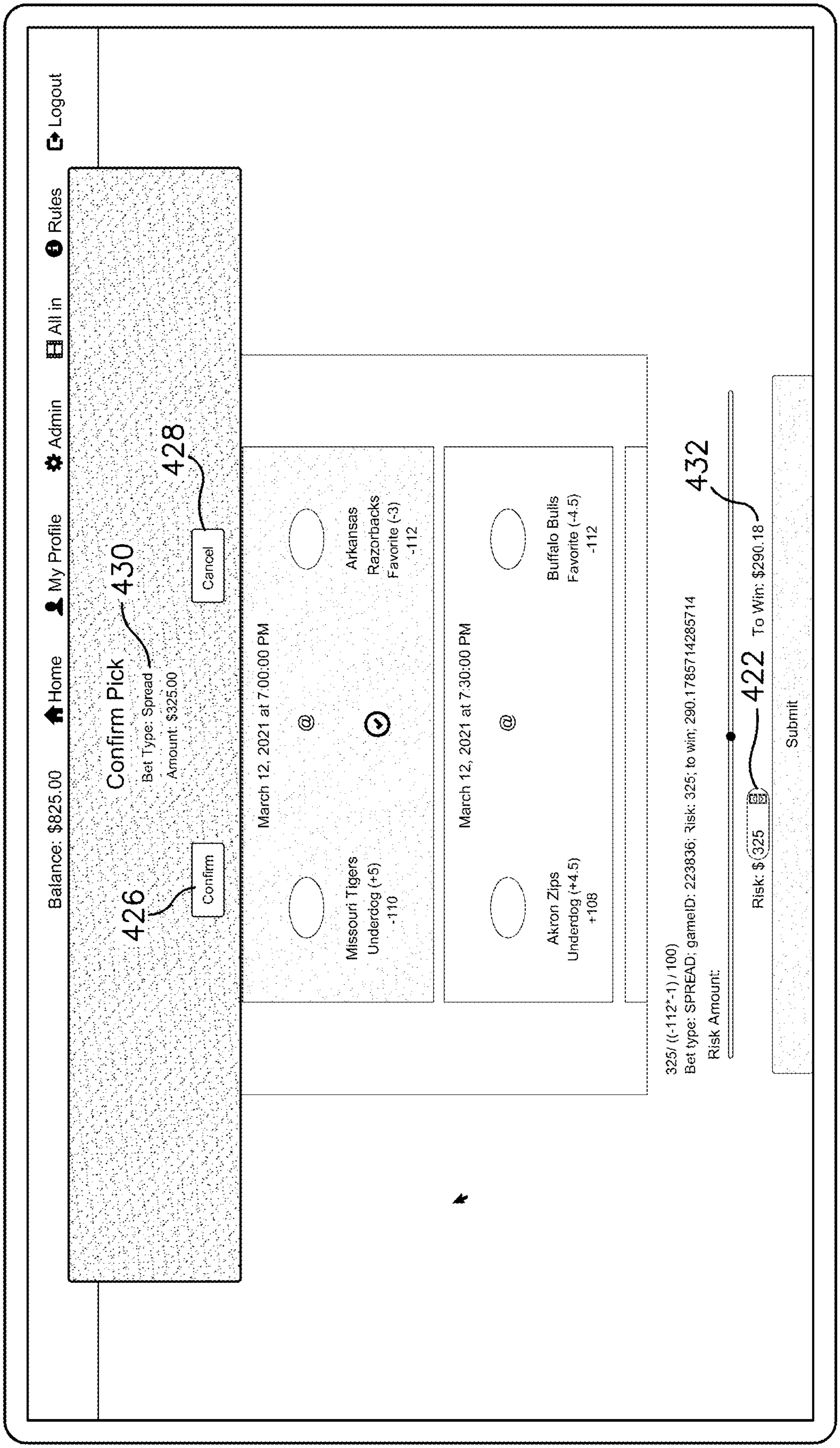
FIG. 9 is a screen shot of an exemplary second confirmation screen of a gaming device in accordance with the present invention.

The betting process continues for each of the other four types of bets to be made. For example, as shown in FIG. 9, a player has already selected the "Spread" 430 bet in a manner similar to that already described for the moneyline Favorite bet, and has entered an amount of $325 in the "Risk" field $422. As also shown in FIG. 8, the system provides a "To Win" 432 calculation of the amount a player will win if successful in the bet. As described previously, a user finalizes their bet or cancels using the "Confirm" 426 or "Cancel" 428 buttons.

Betting continues for the duration of the time period and/or the duration of the event, tournament, etc. As the game progresses, each player's bankroll adjusts for the amount won or lost, and each player's number of remaining bets decreases as they continue to place bets throughout the duration of the game.

Figure 10:
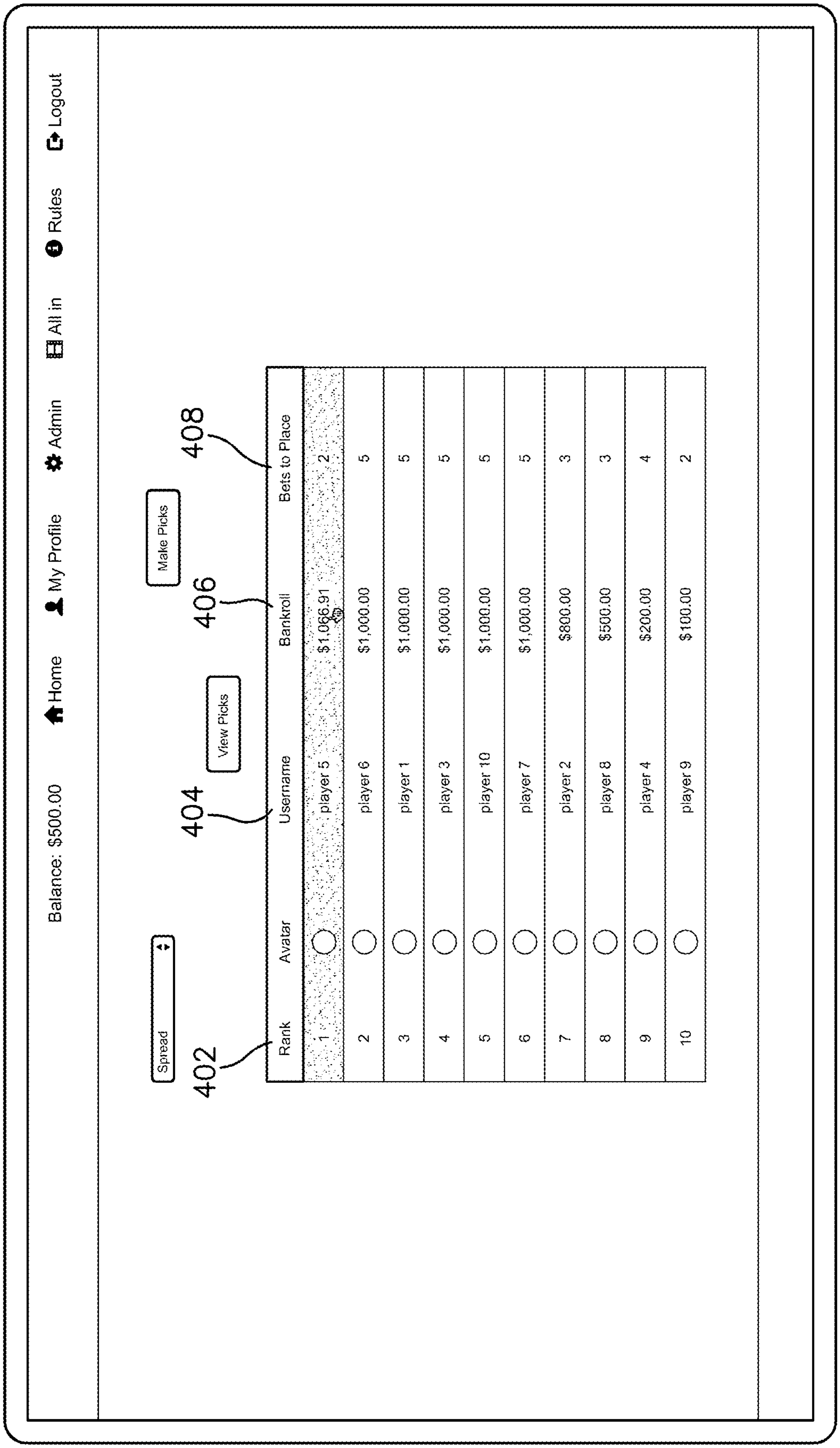
FIG. 10 is a screen shot of an exemplary first day leader board results screen of a gaming device in accordance with the present invention.
Figure 11:
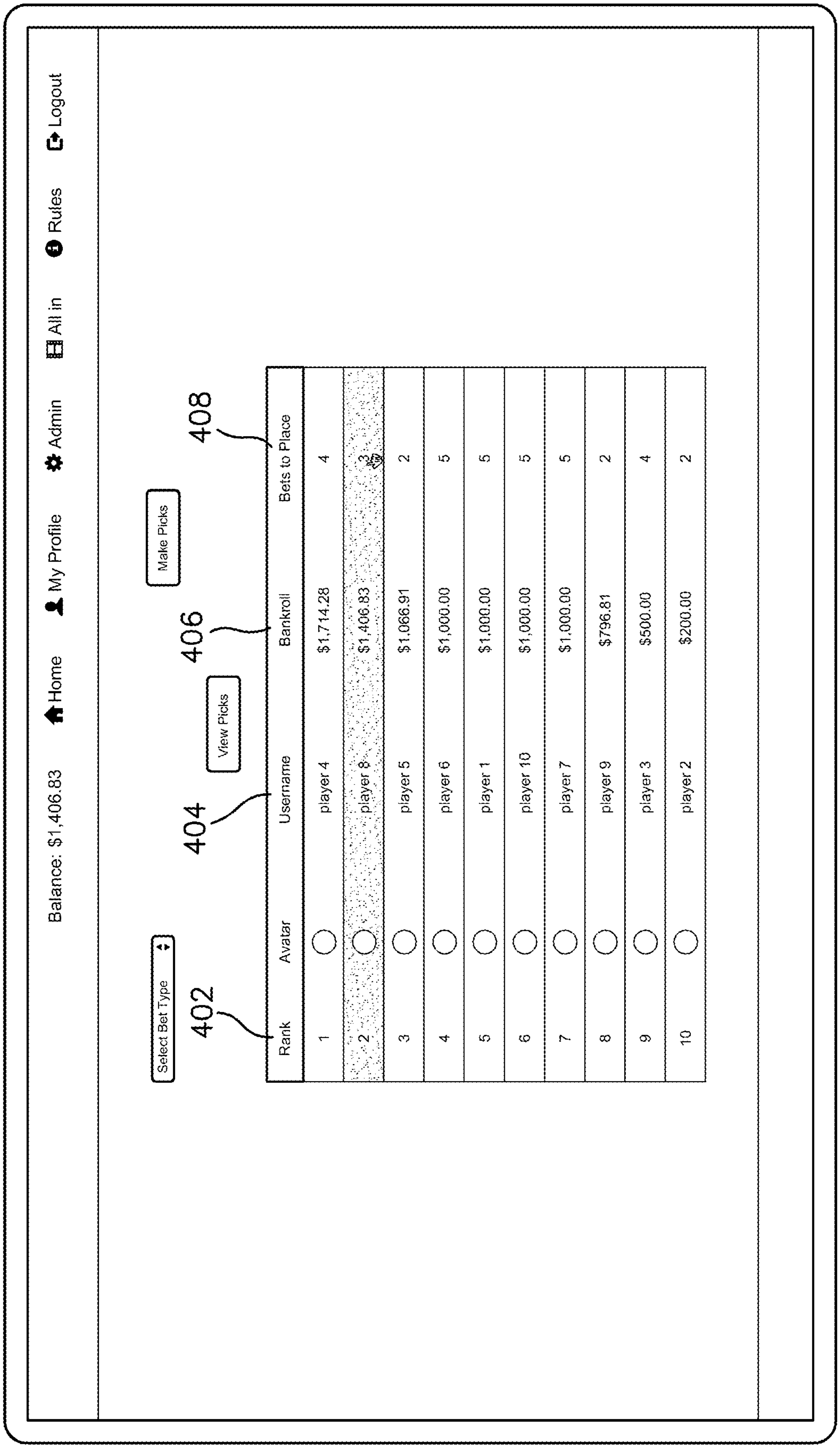
FIG. 11 is a screen shot of an exemplary second day leader board results screen of a gaming device in accordance with the present invention.
Figure 12:
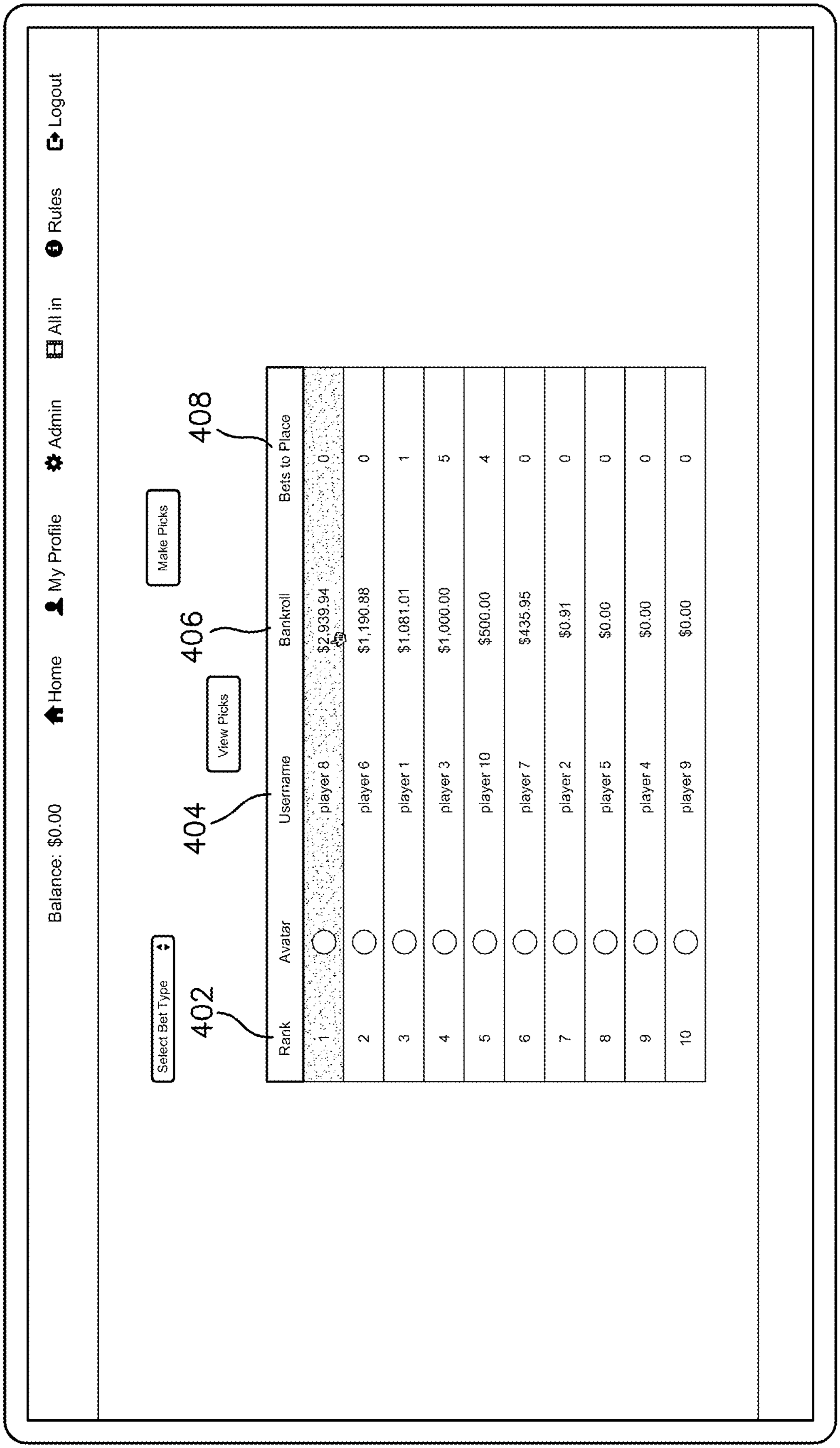
FIG. 12 is a screen shot of an exemplary final day leader board results screen of a gaming device in accordance with the present invention.

Thus, turning to FIGS. 10, 11, and 12, the daily leaderboard results for an exemplary game are presented. As seen in FIG. 10, after the first day of betting on events as just described, the rank 402 of each player 404 is displayed, along with their current bankroll 406 and the number of bets remaining to be placed 408 (of the five required bets).

Looking to FIG. 11, after the second day, the ranking 402 of the players 404 has changed, reflecting the wins and losses of each player in their bankroll 406. And, the number of bets remaining to be placed for each player 408 has been adjusted.

Finally, at the end of the game as seen in FIG. 12, the leaderboad has been updated to reflect the final ranking 402 of the players 404, with the largest bankroll 406 ranking number 1, the next largest ranking number 2, etc. As can also be seen in FIG. 12, most players have exhausted their entire five bets 408. In a preferred embodiment, a player not using all of their bets prior to expiration of the game time period would not be ranked, or would be ranked at the end of the leaderboard.

It should be understood that while the gaming system of the exemplary embodiments have been described with respect to specific sporting events, the gaming system of the present invention may be used in conjunction with any sporting events or game, such as soccer, baseball, basketball, hockey, etc., with the time period for each gaming session and the particular betting odds and gaming selections adjusted to conform to the particular sport or sporting event. Thus, the gaming system of the present invention is adaptable to various sports and various betting and odds scenarios From the above, it can be seen that the system and method for sports wagering of the present invention provides advantages and capabilities not available in currently known gaming systems.

Many different arrangements of the various components depicted, as well as components not shown, are possible without departing from the scope of the claims below. Embodiments of the technology have been described with the intent to be illustrative rather than restrictive. Alternative embodiments will become apparent to readers of this disclosure after and because of reading it. Alternative means of implementing the aforementioned can be completed without departing from the scope of the claims below. Identification of structures as being configured to perform a particular function in this disclosure and in the claims below is intended to be inclusive of structures and arrangements or designs thereof that are within the scope of this disclosure and readily identifiable by one of skill in the art and that can perform the particular function in a similar way. Certain features and sub-combinations are of utility and may be employed without reference to other features and sub-combinations and are contemplated within the scope of the claims.

What is claimed is:

1. A system to provide a peer-to-peer sports game, comprising:

a database configured to store data, the database configured to communicate with third party data providers;

a plurality of user gaming devices, wherein each of the plurality of user gaming devices comprise a processor configured to provide a game interface to a user;

a game server configured to communicate with the database and the plurality of user gaming devices, wherein the game server comprises a processor configured to provide a sports wagering game to each of the plurality of user gaming devices;

the game interface is executable by the processor of the each of the plurality of user gaming devices, wherein the game interface is configured to have the processor of the each of the plurality of user gaming devices execute the sports game to:

present an opening screen to show a plurality of virtual rooms and a predefined number of sporting events available for at least one of viewing and entering;

present a leaderboard screen to show rankings of the plurality of users when the user enters one of the plurality of virtual rooms;

present a plurality of buttons to allow the user to select one of the predefined number of sporting events and a predefined number of different types of competitions on the one of the predefined number of sporting events over a course of the sports game;

allow the user to enter an amount of credits for one of the predefined number of different types of competitions, a first, on the one of the predefined number of sporting events;

present a submit button to allow the user to submit the amount of credits for the one of the predefined number of different types of competitions, the first, on the one of the predefined number of sporting events;

there is a remainder of the predefined number of different types of competitions, not the first;

allow the user to continue to enter and submit amounts of the credits for each of the remainder of the predefined number of different types of competitions, without repeating a previously submitted predefined number of different types of competitions, on the one of the predefined number of sporting events; and update the leaderboard screen to reflect a final ranking of the plurality of users, wherein a winner of the sports game is determined at an end of the sports game based upon the final ranking.

2. The system of claim 1, wherein the sports game is played for a predetermined time period.

3. The system of claim 2, wherein the predetermined time period is defined by a series of related sporting matches of the one of the predefined number of sporting events.

4. The system of claim 3, wherein the series of related sporting matches is a tournament.

5. The system of claim 1, wherein the plurality of user gaming devices are in communication with the game server over a network.

6. The system of claim 5, wherein the network comprises a wide area network, a local area network, or combinations thereof.

7. The system of claim 1, wherein the plurality of users are grouped in the plurality of virtual rooms defined by the game server.

8. The system of claim 1, wherein the predefined number of different types of competitions is five.

9. The system of claim 1, wherein the predefined number of different types of competitions comprises (a) an over/under competition, (b) a spread competition, (c) an underdog credit line competition, (d) a favorite credit line competition, and (e) a parlay competition.

10. The system of claim 9, wherein each of the plurality of users must select a winner for each of the predefined number of different types of competitions.

11. The system of claim 1, wherein each of the predefined number of different types of competitions may be made by each of the plurality of users at any time over the course of the sports game.

12. A method of providing a peer-to-peer sports game, comprising:

storing, in a database, data, the database configured to communicate with third party data providers;

establishing, by a game server, communication with the database and a plurality of user gaming devices, wherein each of the plurality of user gaming devices comprises a processor configured to provide a game interface to a user, and wherein the game server comprises a processor configured to provide a sports game to each of the plurality of user gaming devices;

executing the game interface by the processor of each of the plurality of user gaming devices, wherein the game interface is configured to have the processor of the each of the plurality of user gaming devices execute the sports game by:

presenting an opening screen to show a plurality of virtual rooms and a predefined number of sporting events available for at least one of viewing and entering;

presenting a leaderboard screen to show rankings of the plurality of users when the user enters one of the plurality of virtual rooms;

presenting a plurality of buttons to allow the user to select one of the predefined number of sporting events and a predefined number of different types of competitions on the one of the predefined number of sporting events over a course of the sports game;

allowing the user to enter an amount of credits for one of the predefined number of different types of competitions, a first, on the one of the predefined number of sporting events;

presenting a submit button to allow the user to submit the amount of credits for the one of the predefined number of different types of competitions, the first, on the one of the predefined number of sporting events;

there is a remainder of the predefined number of different types of competitions, not the first;

allowing the user to continue to enter and submit amounts of the credits for each of the remainder of the predefined number of different types of competitions, without repeating a previously submitted predefined number of different types of competitions, on the one of the predefined number of sporting events; and updating the leaderboard screen to reflect a final ranking of the plurality of users, wherein a winner of the sports game is determined at an end of the sports game based upon the final ranking.

13. The method of claim 12, wherein the sports game is played for a predetermined time period.

14. The method of claim 13, wherein the predetermined time period is defined by a series of related sporting matches of the one of the predefined number of sporting events.

15. The method of claim 14, wherein the series of related sporting matches is a tournament.

16. The method of claim 12, wherein the plurality of users are grouped in the plurality of virtual rooms defined by the game server.

17. The method of claim 12, wherein the predefined number of different types of competitions is five.

18. The method of claim 12, wherein the predefined number of different types of competitions comprises (a) an over/under competition, (b) a spread competition, (c) an underdog credit line competition, (d) a favorite credit line competition, and (e) a parlay competition.

19. The method of claim 18, wherein each of the plurality of users must select a winner for each of the predefined number of different types of competitions.

20. The method 12, wherein each of the predefined number of different types of competitions may be made by each of the plurality of users at any time over the course of the sports game.

* * * * *